Dec. 6, 1966 J. SAPY 3,290,558

MOUNTING ARRANGEMENT FOR UNIDIRECTIONALLY CONDUCTIVE DEVICES

Filed Jan. 29, 1964

INVENTOR.
JACQUES SAPY

BY Kurt Kelman

AGENT

United States Patent Office 3,290,558

Patented Dec. 6, 1966

3,290,558

MOUNTING ARRANGEMENT FOR UNIDIRECTIONALLY CONDUCTIVE DEVICES

Jacques Sapy, Valence, Drome, France, assignor to Société Crouzet S.A.R.L., Valence, Drome, France, a French company Filed Jan. 29, 1964, Ser. No. 341,082
Claims priority, application France, Feb. 1, 1963, 923,527, Patent 1,355,034
3 Claims. (Cl. 317—101)

This invention relates to mounting arrangements for devices which conduct electric current preferentially or uniquely in one direction, and more particularly to an assembly of a plurality of such devices, referred to hereinafter as "diodes."

Electronic calculating machines and computers employ large numbers of diodes which are connected with each other and with other circuit elements by conductors. The bulk of conventionally arranged diodes and conductors results in the use of relatively long conductors which not only occupy a substantial amount of space, but are also undesirable as such, particularly in circuits operating at very high frequencies.

An important object of the invention is the provision of a mounting arrangement in which a large number of diodes and the associated conductors are arranged in a minimum of space, thereby not only shortening the conductors, but also simplifying the construction of the apparatus of which the diodes constitute important parts.

Another object is the provision of a mounting arrangement which is simpler to assemble, and therefore more economical than corresponding conventional devices, yet provides more reliable connections.

A more specific object of the invention is the provision of uniform networks of conductively connected diodes which are suitable for stacking in module assemblies.

With these and other objects in view, the invention, in one of its aspects provides a sheet member of electrically insulating material having two opposite faces. The sheet member is formed with a plurality of spaced openings which extend from one face to the other. A diode is arranged in each aperture and its two leads project therefrom in opposite directions. The two faces of the sheet member carry respective electric circuits, and the leads of the diodes are conductively connected to the circuits.

Figure 1:
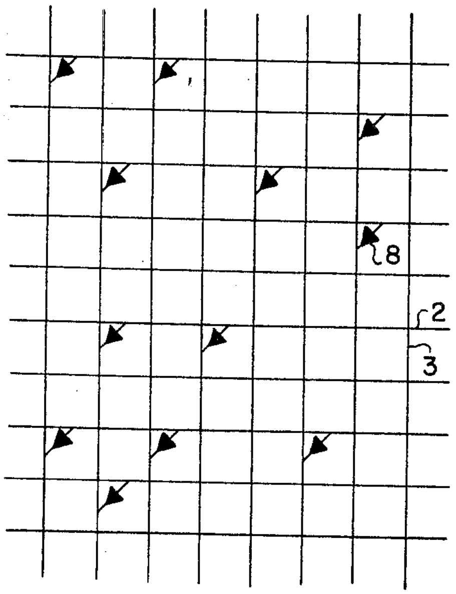
Figure 2:
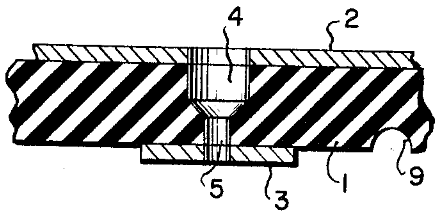
Figure 3:
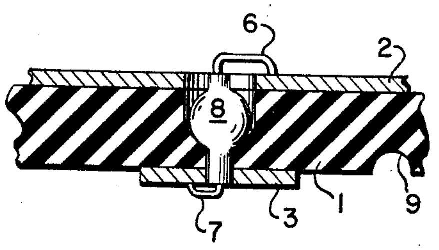

Other features and many of the attendant advantages of this invention will be readily appreciated as the same becomes better understood by reference to the following detailed description when considered in connection with the accompanying drawing in which:

FIG. 1 diagrammatically illustrates a diode assembly of the invention;

FIG. 2 shows a detail of the assembly of FIG. 1 in elevational section, a diode being removed to reveal other features of the device; and FIG. 3 shows the device of FIG. 2 with a diode in place.

Referring initially to FIG. 1, there is shown a mátrix arrangement of ten parallel conductors 2 evenly spaced in a common plane and of eight conductors 3 parallel to each other, perpendicular to the conductors 2, and evenly spaced in a common plane. Twelve diodes 8 are distributed over the matrix of conductors 2, 3 in a pattern not in itself relevant to this invention. Each diode 8 connects a conductor 2 to a conductor 3 for flow of current from the former to the latter.

A detail of the matrix arrangement of FIG. 1 is shown in FIG. 2. A sheet 1 of electrically insulating material carries on one of its two parallel faces the conductors 2, and on the other face the conductors 3, only one member of each group of conductors being visible in FIG. 2. The sheet 1 is perforated. Each opening in the sheet 1 has a wider axial portion 4 and a narrower axial portion 5. The two portions are mainly cylindrical, but the innermost part of the opening portion 4 tapers conically toward the narrower portion 5. The openings are arranged in the sheet 1 in a regular pattern, evident from FIG. 1, wherever conductors 2 and 3 intersect and are separated from each other by the thickness of the sheet only.

Each opening, and more particularly the wider portion 4 thereof, constitutes a receptacle for a semiconductor diode 8. The conductors 2, 3 are elongated strips of metal, and are perforated. Their apertures are aligned with the openings in the sheet 1. They are of the same shape and size as the orifices of the portions 4, 5 of the openings in the sheet 1. The apertures in the conductors 2, 3 are preferably formed simultaneously with the openings of the sheet 1 in a manner conventional in itself.

As shown in FIG. 3 a diode may be inserted into each wider opening portion 4 in such a manner that the two leads 6, 7 of the diode axially extend in opposite directions outward of the orifices of the opening for contact with the conductors 2 and 3 respectively.

The conductors 2 and 3 on the two faces of the sheet 1 may be formed by any conventional process known in the art of printed circuits. They may be elements of a copper foil shaped by die cutting or etching, or they may consist of electrodeposited copper or other conductive metal electrolytically precipitated on a printed pattern of conductive silver paste in the usual manner.

If the material of the sheet 1 is rigid, a plurality of sheets may be stacked in a module assembly, and their circuits of conductors 2, 3 may be interconnected in a known manner. In the illustrated mounting assembly of the invention, the sheet 1 is made of pliable plastic sheet material of suitable electrical properties, and the entire assembly may be rolled up or folded into a cylindrical, prismatic, or other shape for accommodation in a minimum of space. Grooves or creases 9 are preformed in the insulating sheet to facilitate folding of the completed assembly in a reproducible pattern.

Various other modifications are contemplated and may be obviously resorted to by those skilled in the art without departing from the spirit and scope of the invention as hereinafter defined by the appended claims, as only a preferred embodiment has been disclosed.

What is claimed is:

1. A diode mounting arrangement comprising, in combination:

(a) a sheet member of electrically insulating material having two opposite faces, said sheet member being formed with a plurality of spaced openings therethrough, each opening extending from one of said faces to the other face, and having a wider portion adjacent one of said faces and a narrower portion adjacent the other face;

(b) diode means in each of said openings, said diode means being mainly received in said wider portion;

(c) conductor means on each of said faces, (1) each conductor means including a plurality of conductor members elongated in a common direction and spaced from each other transversely of said common direction, (2) the common direction of elongation of the conductor members on said one face being transverse of the direction of elongation of the conductor members on said other face, (3) whereby said conductor members intersect each other, and the thickness of a plurality of spaced portions of said sheet member separates respective intersecting conductor members on its opposite faces thereof, (4) said openings being formed in said spaced portions, and (5) the intersecting conductor members associated with each of said openings being formed with apertures aligned with the associated opening; and (d) two leads on each diode means and extending therefrom in opposite directions outward of the associated opening through said apertures, said leads being respectively connected to said conductor means.

2. An arrangement as set forth in claim 1, wherein said sheet member is pliable.

3. An arrangement as set forth in claim 2, wherein said sheet member is formed with a crease in a face thereof for relative folding movement of two portions of said sheet located on opposite sides of said crease.

References Cited by the Examiner

UNITED STATES PATENTS

| | | | |
|---|---|---|---|
| 2,902,628 | 9/1959 | Leno | 317—101 |
| 2,911,605 | 11/1959 | Wales | 317—101 X |
| 3,105,729 | 10/1963 | Rosenthal et al. | 317—101 X |
| 3,142,783 | 7/1964 | Warren | 317—101 |
| 3,158,927 | 12/1964 | Saunders | 317—101 X |

LEWIS H. MYERS, *Primary Examiner.*

DARRELL L. CLAY, *Examiner.*